United States Patent [19]

Gagnon

[11] Patent Number: 4,809,028

[45] Date of Patent: Feb. 28, 1989

[54] PHOTOPLOTTING APPARATUS

[75] Inventor: Theodore G. Gagnon, Garrettsville, Ohio

[73] Assignee: The Standard Oil Company, Cleveland, Ohio

[21] Appl. No.: 102,453

[22] Filed: Sep. 29, 1987

[51] Int. Cl.$^4$ .................. G01D 9/42; G03B 41/00
[52] U.S. Cl. ............................................ 346/108; 354/4
[58] Field of Search .............. 346/29, 139 R, 108, 346/107 R; 354/4, 5

[56] References Cited

U.S. PATENT DOCUMENTS

| | | | |
|---|---|---|---|
| 3,776,113 | 12/1973 | Parks et al. | 346/29 |
| 3,903,527 | 9/1975 | Frehling | 354/4 |
| 4,363,539 | 12/1982 | Gerber | 354/4 |

OTHER PUBLICATIONS

Description of Western Graphtec, Inc. Photo Pen, *Design Graphics World Magazine*, Aug. 1987, p. 44.
Henningsgard, "Photoplotters: Creating the Critical Shadows", *Printed Circuit Design*, Sep. 1987, pp. 8–15.
Peddie, "Considerations for Choosing an In-House Photoplotter", *Printed Circuit Design*, Sep. 1987, pp. 17–21.
Hill, "Laser Photoplotting Technology," *Printed Circuit Design*, Sep. 1987, pp. 22–23.
Langley, "Plot your Artwork without Photoplotting", *Printed Circuit Design*, Sep. 1987, pp. 24–32.
Newman, "PCB Artwork from a Plotter", *Printed Circuit Design*, Sep. 1987, pp. 40–41.

*Primary Examiner*—E. A. Goldberg
*Assistant Examiner*—Mark Reinhart
*Attorney, Agent, or Firm*—Jeffrey A. Wyand; Joseph G. Curatolo; Larry W. Evans

[57] ABSTRACT

A light pen for converting a conventional graphics plotter into a photoplotter includes a housing containing an electrically powered light source, a battery and a normally open switch. The housing has an aperture opposite the light source. The light pen replaces an ink pen in the plotter. When the light pen is urged against a photosensitive sheet in the plotter, the normally open switch is closed, the light pen is energized and the light pen is transmitted to the sheet to illuminate it. The self-contained light pen is free of trailing electrical and optical cables that might interfere with plotter speed and accuracy.

22 Claims, 2 Drawing Sheets

PHOTOPLOTTING APPARATUS

Computer driven graphics plotters of many types and designs are widely available and are being increasingly used for many purposes. These plotters can prepare diagrams, charts, high quality pictures and other graphical outputs for numerous uses. Some highly specialized plotters are employed to expose photosensitive sheets for preparing master diagrams for photolithographic masks, printed circuit trace layouts and the like. Generally, those very specialized photoplotters are complex and relatively expensive. In order to achieve precise line widths, the known photoplotters employ complicated optics for directing a light beam onto a photosensitive receiver or sheet. In some of the known apparatus, great care is taken to ensure that uniform light exposure of illuminated areas occurs even though the speed of movement of the light source relative to the sheet may vary. In addition, focusing correction mechanisms may be provided to ensure high quality definition of the edges of exposed areas on a photosensitive sheet. Use of different line widths and the formation of complex shapes on the photosensitive sheet present additional problems that the known photoplotters attempt to resolve with a variety of expensive components.

Typically, after a photosensitive sheet has been exposed in a photoplotter according to a prepared set of instructions, the photosensitive sheet is developed and employed as a master for preparing other products. For example, a master sheet may be employed as a mask for exposing a photosensitive material disposed on a printed circuit board. The exposed areas define metallic traces (or their inverse) so that electrical interconnections can be formed on the board in a metal plating or etching process. In a related process, the printed circuit board, itself, is coated with a film of a photosensitive material that is directly exposed to light and developed.

Typically, the known photoplotters include a light source mounted on a plotter head that can be moved in two orthogonal directions relative to the area of a photosensitive sheet. The light source is supplied with electricity by means of an electrical cable extending from the plotter head to a control apparatus. The control apparatus, typically a computer, drives the head to various locations relative to the sheet and energizes the light source, as necessary, to produce the desired pattern. In an alternative arrangement, the plotter head may be supplied with light via an optical fiber bundle or other light transmitting cable. In that event, the light producing member is not directly present on the movable plotter head, but is still illuminated and extinguished under control of a computer or other control apparatus.

In many applications it is desirable to make a limited number of products of a particular design, such as a specific printed circuit board. In those cases it is not economical to purchase an expensive photoplotting apparatus or even to hire services of an owner of such apparatus. Yet, most businesses, manufacturing, and development installations, have a graphics plotter and a personal (or larger) computer to operate the plotter.

Accordingly, it is desirable to provide simple and inexpensive apparatus for adapting existing graphics plotters and computers for use as photoplotting apparatus. Preferably, that apparatus can be used when needed without requiring changes to the plotter. After photoplotting, the graphics plotter can be restored to its conventional graphics plotting role.

SUMMARY OF THE INVENTION

In the invention, a graphics plotter includes a holder for retaining a photosensitive sheet, such as a sheet of film or a metal plated circuit board coated with a film of photosensitive material. The plotter includes a drive for controllably moving a light pen across the area of the sheet. The plotter can raise or lower the light pen relative to the sheet. When the light pen is lowered onto the photosensitive sheet and makes contact with it, a light source within the pen is energized, illuminating the photosensitive sheet. Preferably, the light pen includes a housing enclosing an electrically driven light source, such as a light emitting diode, an electrical power source, such as a battery, for driving the light source and a normally open electrical switch for connecting and disconnecting the battery to the light source. The housing is opaque and includes an aperture opposite the light source through which a beam is transmitted to the photosensitive sheet. The aperture may be of any preselected size or shape to form a desired image on the photosensitive sheet.

A preferred light pen housing includes two barrels slidably mounted with respect to each other along a common central axis. A resilient biasing element urges the two barrels apart from each other along the axis, to the extent permitted. An internal tube, frictionally mounted in one of the barrels, includes a flange that engages the other barrel and prevents the barrels from being totally withdrawn from each other. One of the barrels includes a peripheral flange for engaging the plotting head mounting fixture of a conventional plotter. When the plotting head is moved toward a photosensitive sheet mounted in a plotter, the barrel containing the aperture for transmission of a light beam contacts the sheet and the barrels are urged together. The resilient biasing element yields in response to the urging force resulting in closure of the electrical switch and energization of the light source to illuminate the photosensitive sheet.

The mechanical design of the light pen permits it to be temporarily substituted for a conventional ink pen or other drawing element in a plotter head. The direct substitution means that a conventional, available plotter can be used as a photoplotter, when needed, and restored to its original use when the photoplotting task is completed. Numerous light pens according to the invention can be employed in a conventional plotter that normally employs multiple interchangable pens. In that arrangement, different light pens having different aperture shapes and/or sizes can be employed to complete a single plotting task. Preferably, the light pen is self-contained meaning that no optical or electrical cables extend from the light pen to interfere with speed and accuracy of a plotter head.

DETAILED DESCRIPTION OF PREFERRED EMBODIMENTS

Figure 1:
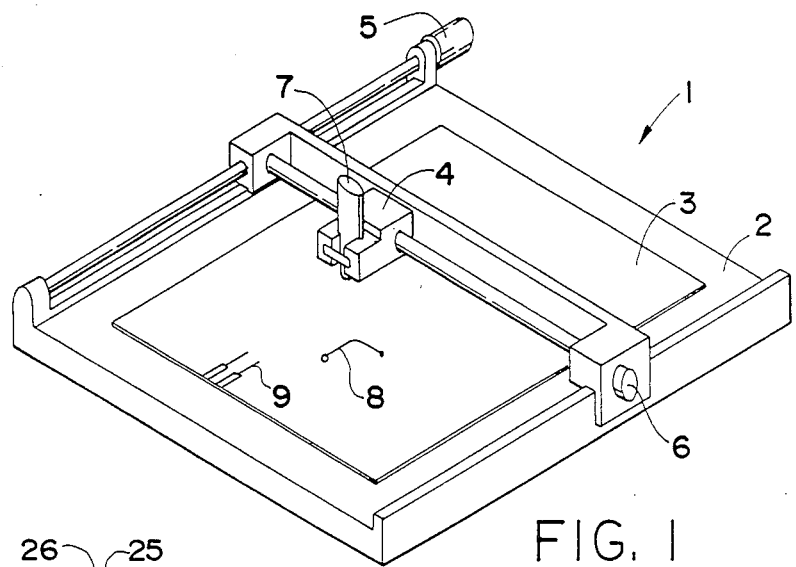
FIG. 1 is a perspective view of a flatbed plotter holding a photosensitive sheet and employing a light pen, all in accordance with an embodiment of the invention.

In FIG. 1 a conventional flatbed x-y plotter 1 is shown. Plotter 1 has a bed 2 for receiving and holding in a fixed location a sheet of material such as a photosensitive sheet 3. Plotter 1 includes a plotting head 4 that can move in two orthogonal directions across the area of sheet 3. Plotting head 4 is driven, in the example plotter 1, by separate x and y drive motors 5 and 6. These motors are driven by electrical signals controlled by a computer. The electrical signals are provided over cables that are omitted from FIG. 1 for clarity. These motors drive screws that control the positioning of head 4. In other, more modern plotters, the plotting head is mechanically driven by endless cables. Still other drive mechanisms may be used to move plotting head 4 to any location over sheet 3, following any selected path across the sheet. In some plotters, sheet 3 is mounted on or paid out over a cylinder of circular cross section. In that design, the motion of the cylinder provides one axis of relative movement of the plotting head with respect to the sheet. The plotting head moves along only one linear direction, providing the other orthogonal motion direction relative to the sheet.

Plotting head 4 includes a mounting means for holding an ink pen or other device for drawing a line or other shape on sheet 3. In some conventionally available plotters, a rotatable carousel for retaining a number of different ink pens is provided. In those plotters, the plotting head mounting means includes the ability to select an ink pen from the carousel, to draw lines or other shapes with that ink pen, to return that ink pen to the carousel and to select another ink pen from the carousel to continue the plotting task. With these plotters, ink pens of different widths or containing different colored inks may be employed in a single plotting task. The multiple ink pens can simplify and speed a task or can produce multiple color graphical outputs. This carousel arrangement is not illustrated in FIG. 1, bu the invention may be employed with a plotter using multiple light pens in the carousel in place of the pens.

In FIG. 1, a light pen 7 according to an embodiment of the invention has been substituted for an ink pen in plotting head 4. Plotting head 4 moves light pen 7 over the surface of photosensitive sheet 3 in order to expose selected areas to establish a desired pattern on the sheet. For example, if photosensitive sheet 3 is being employed to prepare a printed circuit board or a master transparency for manufacturing printed circuit boards, light pen 7 can expose a trace 8 ending in a solder pad. Pattern 9 illustrates two terminals for use with a printed circuit board edge connector and portions of the electrically conductive traces extending from the connector pads.

In most conventional plotters, the ink pen is normally held spaced from the sheet on which it is to draw lines. The plotting instructions, normally supplied from a computer, direct the plotting head to move to a location where a line is to commence. Thereafter a "PEN DOWN" instruction actuates a solenoid or other mechanical means that rotates the plotting head around an axis generally parallel to sheet 3. The rotation is sufficient to place the ink pen in contact with the sheet. Subsequent instructions cause the plotting head to move so that a line is drawn on the sheet following the desired path. At the end of the line, a "PEN UP" instruction releases the plotting head from its rotated position and causes the ink pen to be retracted, breaking contact with the sheet. These kinds of instructions are repeated, as necessary, to complete the plotting task.

Referring to FIG. 1, light pen 7 in plotting head 4 is brought into direct contact and urged against photosensitive sheet 3 whenever a "PEN DOWN" command is given to plotter 1. Likewise, a "PEN UP" command retracts light pen 7 breaking the mechanical contact between it and sheet 3. As explained in more detail below, when light pen 7 is urged against sheet 3 by a "PEN DOWN" command, or the like, a light source within pen 7 is energized so that sheet 3 is illuminated. Thus, in a manner completely analogous to establishing and breaking contact between an ink pen point and a paper sheet, light pen 7, under control of computer instructions, illuminates a desired pattern on photosensitive sheet 3 by being repeatedly advanced, moved across the area of the sheet and retracted.

Figure 2:
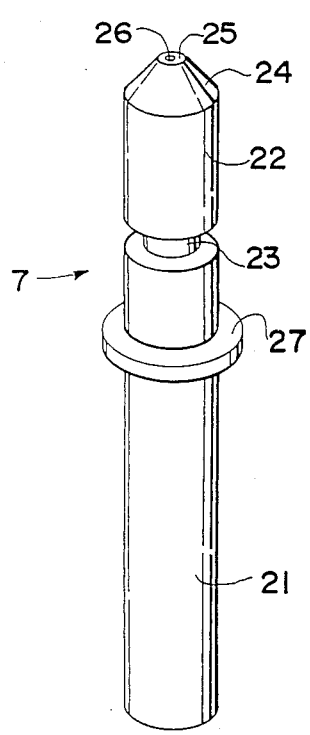
FIG. 2 is a perspective view of a light pen according to an embodiment of the invention.

FIG. 2 provides a more detailed view of light pen 7. In FIG. 2 light pen 7 is inverted relative to the view of FIG. 1. Light pen 7 includes a first barrel 21, a second barrel section 22 and a tubular portion 23 joining barrels 21 and 22. Barrels 21 and 22, as further explained below, are slidably connected along their coincident central longitudinal axes. Barrels 21 and 22 slide relative to each other along tube 23 when urged together. Barrel 22 includes an end in the shape of a frustrum of a cone. The frustrum includes a tapered portion 24 and a generally planar end surface 25. An aperture 26 in surface 25 permits a beam of light produced inside of light pen 7 to be transmitted to the outside. The transmitted light may illuminate a photosensitive sheet, such as a sheet of photographic film or an article that has been coated with a film of photosensitive emulsion, such as a photoresist. A circumferential collar 27 extends peripherally from barrel 21 for engagement and mounting of pen 7 in a conventional plotter head. By judicious choice of the dimensions of collar 27, a light pen embodiment according to the invention may be used in a large number of different plotters produced by various manufacturers. In addition, different mounting means may be provided on a light pen according to the invention to adapt it for a particular manufacturer's plotting head mounting fixture.

Figure 3A:
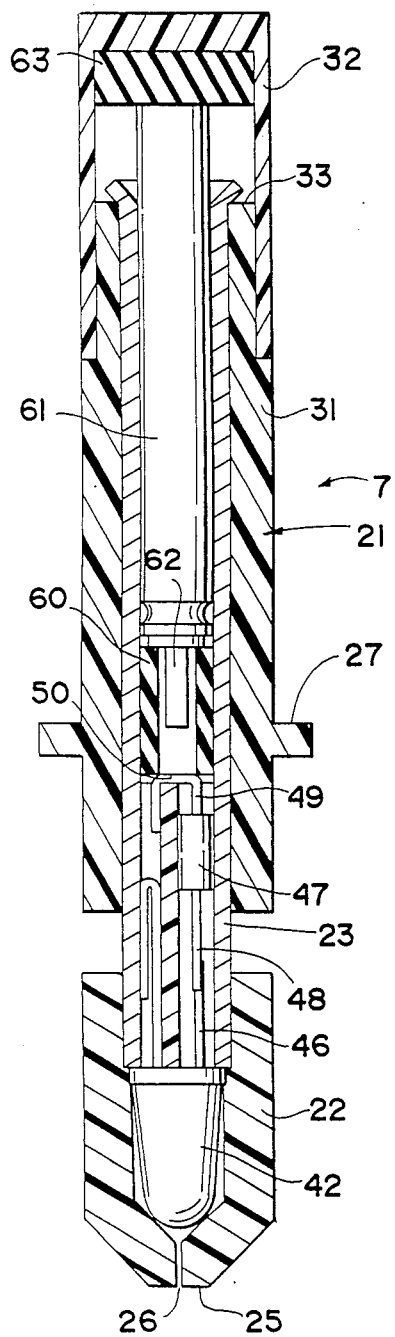
FIGS. 3A and 3B are sectional views of a light pen according to an embodiment of the invention.
Figure 3B:
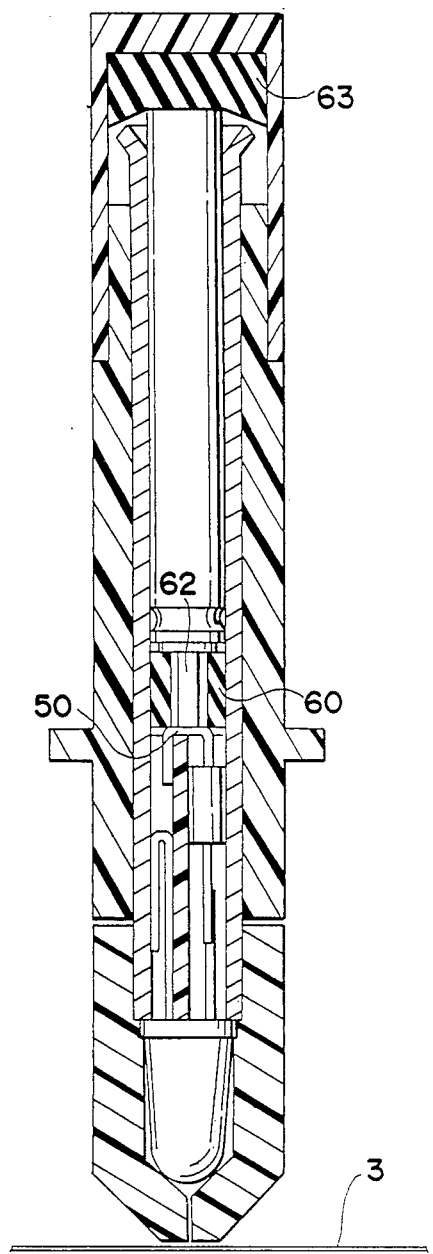

A preferred internal construction for light pen 7 is illustrated in the sectional views of FIGS. 3A and 3B. In FIG. 3A, light pen 7 is shown as in FIG. 2 in which barrels 21 and 22 are not subjected to external forces and are relaxed relative to each other. In FIG. 3B, light pen 7 is restrained in a plotting head (not shown), surface 25 is in contact with photoresponsive sheet 3 and the plotting head is urging surface 25 against sheet 3. That is, in FIG. 3A no light is being generated in pen 7; but in FIG. 3B, light is being produced and is transmitted through aperture 26 to illuminate a selected area of photosensitive sheet 3.

Barrels 21 and 22 are preferably made of a material that is easily moldable and/or machinable such as a plastic or polymer. Preferably, that material is electrically insulating and has a relatively low coefficient of friction. Acetyl resins, such as E.I. DuPont's Delrin, are apt materials for barrels 21 and 22. At least barrel 22 must be opaque to light generated within pen 7 so that the only light escaping from the source is that transmitted through aperture 26. Barre 21 comprises two portions, a tubular portion 31 and an end cap 32. As illustrated in FIG. 3A, end cap 32 is attached to the distal end of tubular portion 31 to close that distal end of barrel 21. End cap 32 may be attached to tubular portion 31 with screw threads, with an adhesive or with a thermal seal. End cap 32 gives access to the interior of pen 7 during assembly. When screw threads are employed to attach the end cap, access to the inside of tube 31 can be obtained for replacement of a spent battery. The distal end of tubular portion 31 is an annular shoulder 33 useful in the operation of the source as further described below.

An electrically conductive tube 23 provides an electrical and mechanical link between barrels 21 and 22. Preferably, tube 23 is made of a workable metal, such as aluminum. Barrel 22 has an inside diameter dimensioned to receive the proximate end of tube 23 in a frictional fit so that tube 23 is retained on barrel 22. The inside diameter of tubular portion 31 of barrel 21 is slightly larger than the outside diameter of tube 23. As a result, a sliding connection is established between barrel 22 and tube 23. The distal end of tube 23 is swaged or flared outwardly so that it can engage annular shoulder 33, to prevent withdrawal of tube 23 from barrel 21.

Assembly of the light pen proceeds by inserting tube 23 through the distal end of tubular portion 31 of barrel 21 and then establishing the frictional fit between tube 23 and barrel 22. After the other components are installed within source 7, end cap 32 is applied to complete assembly of the source. Because of the sliding fit between tube 23 and barrel 21, barrels 21 and 22 can slide toward each other along their essentially coincidental central longitudinal axes. Barrels 21 and 22 can be separated by tensile forces applied along that axis until the flared end of tube 23 is restrained by annular shoulder 33.

Figure 4:
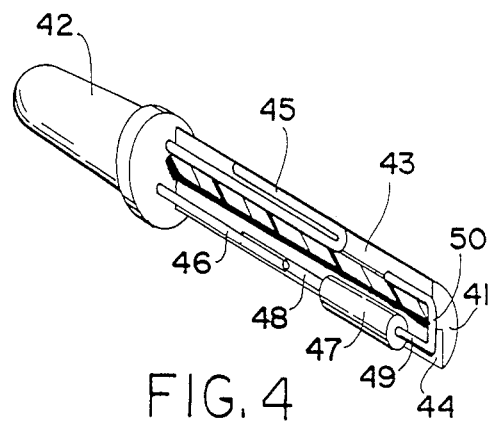
FIG. 4 is a perspective view, partially in section, of an assembly for use in a light pen according to an embodiment of the invention.

FIG. 4 shows a view of a partly broken away fixture 41, and related elements. Fixture 41 is inserted into the proximal end of tube 23 to assist in supplying electrical current to a light emitting diode 42 that is disposed in the forward end of barrel 22. Fixture 41 is shaped to fit snugly within tube 23 and contains two opposed longitudinal grooves 43 and 44 for holding electrical leads and an electrical component in desired relative locations. The view of fixture 41 in FIG. 4 has been sectioned to reveal grooves 43 and 44. Fixture 41 may be made of a plastic or polymer material such as Delrin or a nylon.

Light emitting diode 42 includes two electrical leads 45 and 46. Lead 45, which is the cathode in the embodiment illustrated, is bent into a U-shape and disposed in groove 43. As best seen in FIGS. 3A and 3B, lead 45, because of its bend and the depth of groove 43, is in electrical and mechanical contact with tube 23. Lead 45 from light emitting diode 42 is disposed within groove 44 of fixture 41. Also disposed within that groove is a current limiting resistor 47. A lead 48 of resistor 47 is soldered to lead 46 of diode 42 with the joint disposed within groove 44. The body of resistor 47 is electrically insulating and the rigidity and positioning of leads 46 and 48 prevents them from coming into contact with tube 23. The other lead, lead 49, from resistor 47 contains two ninety degree bends. A portion 50 of that lead is disposed on the end of fixture 41 opposite diode 42. The distal portion of lead 49 is disposed in groove 43, but not in electrical contact with lead 45 from diode 42. Because of its rigidity, lead 49 does not contact tube 23. Portion 50 of lead 49 forms one contact of a normally open switch that is closed when barrels 21 and 22 are urged toward each other along their common longitudinal axis.

Returning to FIGS. 3A and 3B, a length of a resilient, elastomeric tubing 60 is mounted within tube 23 immediately adjacent the distal end of fixture 41. The central hole in tubing 60 provides access to contacting portion 50 of lead 49. A pin-type battery 61 is disposed within tube 23 immediately adjacent the distal end of tubing 60. Pin-type batteries are commerically available from Panasonic in voltage and current capacities sufficient for a nominal 50 hour operating lifetime when powering a light emitting diode. Battery 61 includes a projecting pin anode 62 that is disposed within elastomeric tubing 60 but, as shown in FIG. 3A, is not normally in contact with contacting portion 50 of lead 49. The body of battery 61 is in electrical and mechanical contact with tubing 23 so that tubing 23 acts as an electrical conductor for the cathode connection of battery 61. The distal end of battery 61 is separated from end cap 32 by a resilient elastomeric spacer 63 that is in mechanical contact with both end cap 32 and battery 61. Tubing 60 and spacer 63 apply biasing forces that hold barrels 21 and 22 apart, yet allow the barrels to slide toward each other when a compressive force is applied to the barrels.

Application of compressive forces to barrels 21 and 22 along their common central axes is illustrated in FIG. 3B. There, under the influence of the compressive force, tubing 60 has been foreshortened and spacer 63 is deflected by the end of battery 61. The compression has placed anode 62 of battery 61 in mechanical and electrical contact with contacting portion 50. This contact completes the electrical circuit containing light emitting diode 42. Electrical current flows from battery 61 through the diode so that the diode produces light that exits through aperture 26. Thus, the structure described forms a normally open electrical switch that is closed when compressive forces are applied along the common longitudinal axis of barrels 21 and 22. Diode 42 remains energized so long as the compressive force is applied, but is extinguished when the force is relieved.

Tubing 60 and spacer 63 may be made of any convenient rubber material. These elements act as springs and may be replaced by other spring constructions provided that electrical insulation is maintained between tube 23 and both of battery terminal 62 and contacting portion 50 of lead 49. Use of tubing as resilient element 60 is particularly advantageous since it is actually disposed about battery terminal 61 and therefore is effective in preventing short-circuiting of the battery through tube 23.

From the foregoing discussion, it can be seen that light pen 7 is entirely self-contained and requires no trailing optical or electrical cables that could interfere with plotter operation. The light pen is inexpensive, compact and easily installed and removed from the head of a graphics plotter.

In order to use light pen 7, the ink pen is removed from the head of a graphics plotter and light pen 7 is installed in its place. The particular light pen embodiment chosen is selected to have an aperture of the size and shape necessary to produce the desired pattern. As noted above, with a carousel-type plotter, numerous light pens 7 with different size or shape apertures may be employed in completing a single plotting task. Before or after the light source is installed, a photosensitive sheet is mounted in the graphics plotter.

It may be necessary to install the photosensitive sheet in the dark and, most likely, it will be necessary to operate the plotter in the dark to avoid fogging of the photosensitive material. The light source within light pen 7 may be a light emitting diode, an incandescent bulb or another battery powered light source. The light source may produce visible light or significant amounts of non-visible electromagnetic radiation. (As used here, the term light includes both visible light and non-visible electromagnetic radiation.) A particular light source is chosen to produce the portion of the electromagnetic spectrum to which the photosensitive sheet or material is sensitive. If the photosensitive material is more responsive to invisible light than to visible light, light pen 7 may produce little visible light. In that case, plotting might be carried out in ordinary or reduced room light or in the presence of a safety light, without damage to the photosensitive sheet.

In my experience, light pen 7 may be used with surface 25 in direct mechanical contact with a photographic film emulsion without damaging that emulsion. Alternatively, film can be inverted so that its transparent substrate, rather than the emulsion, is in direct contact with surface 25. The photosensitive layer on circuit boards or other sheet materials might likewise be protected with a transparent layer, temporarily applied, but experience suggests that such protection is not required since little or no abrasive damage is inflicted by pen 7. Likelihood of abrasion is reduced by forming barrel 22 from other low friction material such as Delrin or a fluorocarbon resin.

The invention has been described with respect to certain perffered embodiments. Various additions and modifications within the spirit of the invention will occur to those of skill in the art. Accordingly, the scope of the invention is limited solely by the following claims.

I claim:

1. An apparatus for controllably forming images on a photosensitive sheet comprising:
   a plotting apparatus having: means for holding a photosensitive sheet; means for receiving a light pen and for moving said light pen relative to and across the area of said sheet; and means for extending said light pen toward said sheet to urge said pen against said sheet and for retracting said light pen from said sheet; and
   at least one light pen including means for mounting said light pen on said means for receiving and moving, a housing for containing an electrical power source and containing an electrically powered light source and normally open electrical switch for electrically connecting said power source to said light source, said housing having an aperture opposite said light source for transmission of a light beam out of said housing, and means for closing said switch when said pen is urged against said sheet.

2. The apparatus of claim 1 wherein said light pen is self-contained and is free of electrical and optical cables extending from said pen.

3. The apparatus of claim 1 wherein said light source is a light emitting diode.

4. The apparatus of claim 1 wherein said housing contains a battery as said electrical power source for powering said light source.

5. The apparatus of claim 1 wherein said means for mounting includes a collar peripherally extending from said housing for engagement with said plotting apparatus.

6. The apparatus of claim 1 wherein said housing comprises first and second barrel means slidably engaging each other along a common longitudinal axis, biasing means for urging said first and second barrel means apart along said axis to maintain said switch in a normally open position and for yielding to close said switch when said first and second barrel means are urged toward each other along said axis.

7. The apparatus of claim 6 wherein said biasing means comprises a length of a resilient, elastomeric tubing coaxially disposed within said first barrel means.

8. The apparatus of claim 6 wherein said first barrel means includes means for preventing withdrawal of said first barrel means from said second barrel means along said axis.

9. The apparatus of claim 1 wherein said plotting apparatus includes means for releasably receiving said light pen and said means for mounting include s a collar peripherally extending from said housing for releasable engagement by said means for releasable engaging.

10. A light pen for mounting as the drawing element of a graphics plotter comprising a housing for containing a source of electrical power and containing an electrically driven light source, an electrical switch for electrically connecting and disconnecting said lgiht source to said source of electrical power, said switch being normally open and being closed when said source of light is urged against a photosensitive sheet mounted in a graphics plotter, said housing having an aperture opposite e aid light source for transmission of the light be am out of said housing, and means for mounting said light pen on a graphics plotter.

11. The light pen of claim 10 wherein said pen is self-contained and is free of electrical and optical cables extending from said source of light.

12. The light pen of claim 10 wherein said light source is a light emitting diode.

13. The light pen of claim 12 including a battery contained within said housing as said source of electrical power for powering said light source.

14. The light pen of claim 10 wherein at least part of said housing is opaque to light produced by said light source.

15. The light pen or claim 10 wherein said means for mounting includes a collar peripherally extending from said housing for engagement with a plotting apparatus.

16. The light pen of claim 10 wherein in said housing comprises first and second barrel means slidably engaging each other along a common longitudinal axis, biasing means for urging said first and second barrel means apart along said axis to maintain said switch in a normally open position and for yielding to close said switch when said first and second barrel means are urged toward each other along said axis.

17. The light pen of claim 16 wherein said biasing means comprises a length of a resilient, elastomeric tubing coaxially disposed within said first barrel means.

18. The light pen of claim 16 wherein said first barrel means includes means for preventing withdrawal of said first barrel means from said second barrel means along said axis.

19. The light pen of claim 18 wherein said means for limiting comprises an annular shoulder surrounding an opening in said first barrel means, a tube disposed coaxially and within said first and second barrel means, passing through said opening, slidably engaging said first barrel means and frictionally engaging said second barrel means, said tube having a flared end larger than said opening and disposed on the side of said opening opposite second barrel means for engaging said shoulder.

20. The light pen of claim 15 comprising a tube coaxially disposed within said first and second barrel means, frictionally engaging said second barrel means and slidably engaging said first barrel means.

21. The light pen of claim 20 comprising a battery having two electrodes and disposed within said housing, wherein said light source is a light emitting diode having two terminals, said tube is electrically conducting and is in electrical and mechanical contact with one of said electrodes and one of said terminals, the other of said terminals is electrically connected in a series with one of two leads of a current limiting resistor and said switch comprises the other of the leads of said resistor and the other of said electrodes.

22. The light pen of claim 16 wherein said biasing means is disposed between said second lead and said battery.

* * * * *